United States Patent
Lee et al.

(10) Patent No.: US 12,036,695 B2
(45) Date of Patent: Jul. 16, 2024

(54) APPARATUS AND METHOD FOR JOINING OF CARBIDE CERAMICS

(71) Applicant: University of Pittsburgh—Of The Commonwealth System of Higher Education, Pittsburgh, PA (US)

(72) Inventors: Jung-Kun Lee, Sewickley Hills, PA (US); Ian Nettleship, Pittsburgh, PA (US); Ryan W. Read, Indiana, PA (US)

(73) Assignee: University of Pittsburgh—Of The Commonwealth System of Higher Education, Pittsburgh, PA (US)

( * ) Notice: Subject to any disclaimer, the term of this patent is extended or adjusted under 35 U.S.C. 154(b) by 773 days.

(21) Appl. No.: 17/164,474

(22) Filed: Feb. 1, 2021

(65) Prior Publication Data

US 2021/0316473 A1 Oct. 14, 2021

Related U.S. Application Data

(63) Continuation of application No. 15/651,839, filed on Jul. 17, 2017, now Pat. No. 10,906,203.

(60) Provisional application No. 62/362,973, filed on Jul. 15, 2016.

(51) Int. Cl.
| | |
|---|---|
| *C04B 35/571* | (2006.01) |
| *B28B 1/00* | (2006.01) |
| *B33Y 10/00* | (2015.01) |
| *B33Y 70/10* | (2020.01) |
| *C04B 35/56* | (2006.01) |
| *C04B 35/565* | (2006.01) |
| *C04B 35/632* | (2006.01) |
| *C04B 35/64* | (2006.01) |
| *C04B 37/00* | (2006.01) |

(52) U.S. Cl.
CPC .............. *B28B 1/001* (2013.01); *B33Y 10/00* (2014.12); *B33Y 70/10* (2020.01); *C04B 35/5607* (2013.01); *C04B 35/5626* (2013.01); *C04B 35/565* (2013.01); *C04B 35/571* (2013.01); *C04B 35/632* (2013.01); *C04B 35/64* (2013.01); *C04B 37/005* (2013.01); *C04B 2235/40* (2013.01); *C04B 2235/405* (2013.01); *C04B 2235/422* (2013.01); *C04B 2235/483* (2013.01); *C04B 2235/5454* (2013.01); *C04B 2235/6025* (2013.01); *C04B 2235/80* (2013.01); *C04B 2237/083* (2013.01); *C04B 2237/365* (2013.01)

(58) Field of Classification Search
CPC ........ C04B 35/571; C04B 35/565; C09J 1/00; C09J 183/16
See application file for complete search history.

(56) References Cited

U.S. PATENT DOCUMENTS

| | | | | |
|---|---|---|---|---|
| 4,514,346 A | * | 4/1985 | Luhleich | ............... C04B 35/573 264/670 |
| 2016/0001526 A1 | * | 1/2016 | Shino | ........................ B32B 1/08 428/34.4 |

FOREIGN PATENT DOCUMENTS

WO 2014/133068 * 9/2014

* cited by examiner

*Primary Examiner* — Margaret G Moore
(74) *Attorney, Agent, or Firm* — Paul D. Bangor, Jr.; Clark Hill PLC

(57) ABSTRACT

A bonding tape for joining carbide ceramic structures, wherein the bonding tape comprises: a mixture comprising carbide ceramic particles, preceramic polymer liquid, fine carbon particles and metal nanoparticles that form a eutectic liquid at temperatures below 1400° C.

8 Claims, 4 Drawing Sheets

Dry Bed Printing

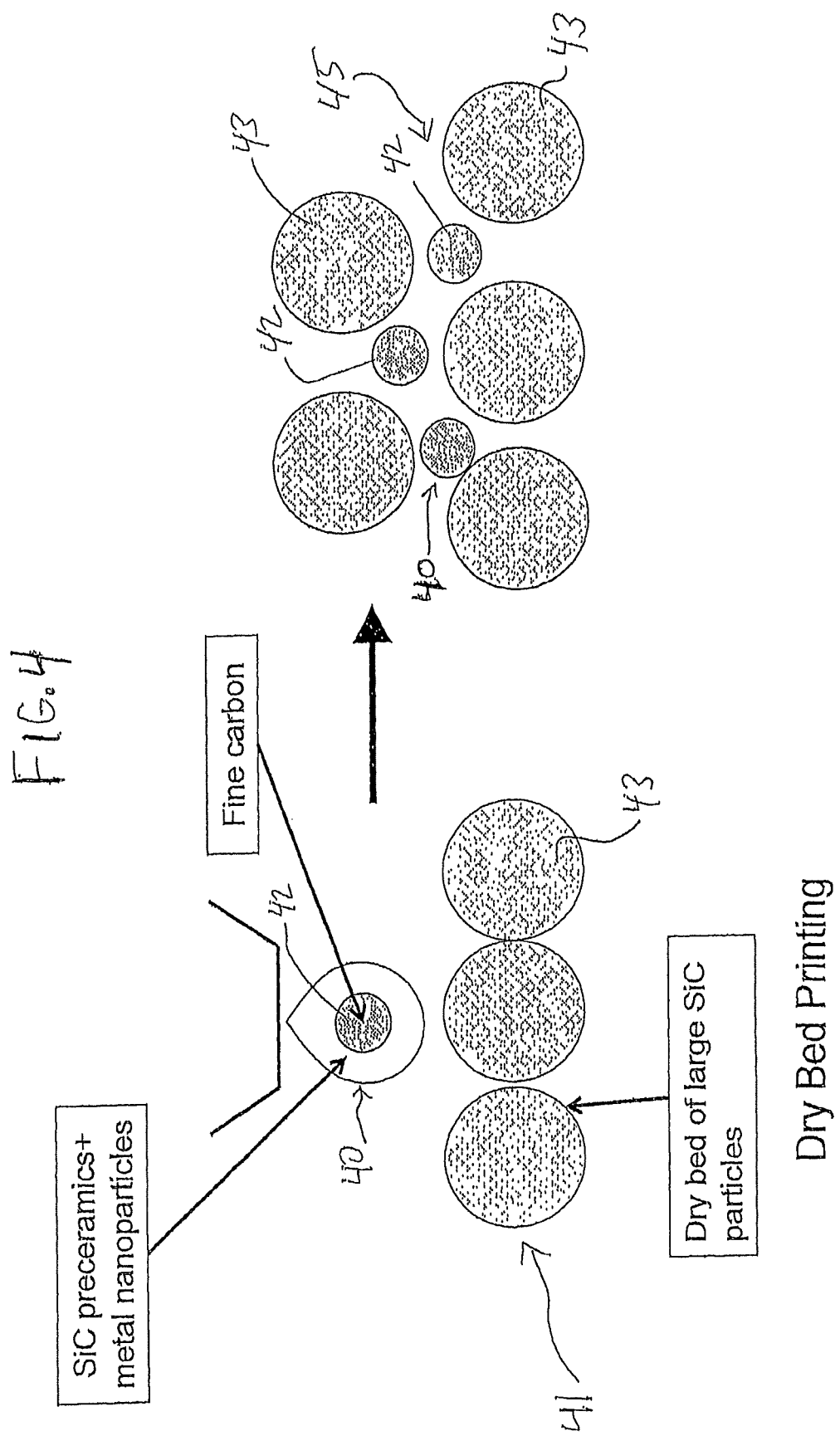

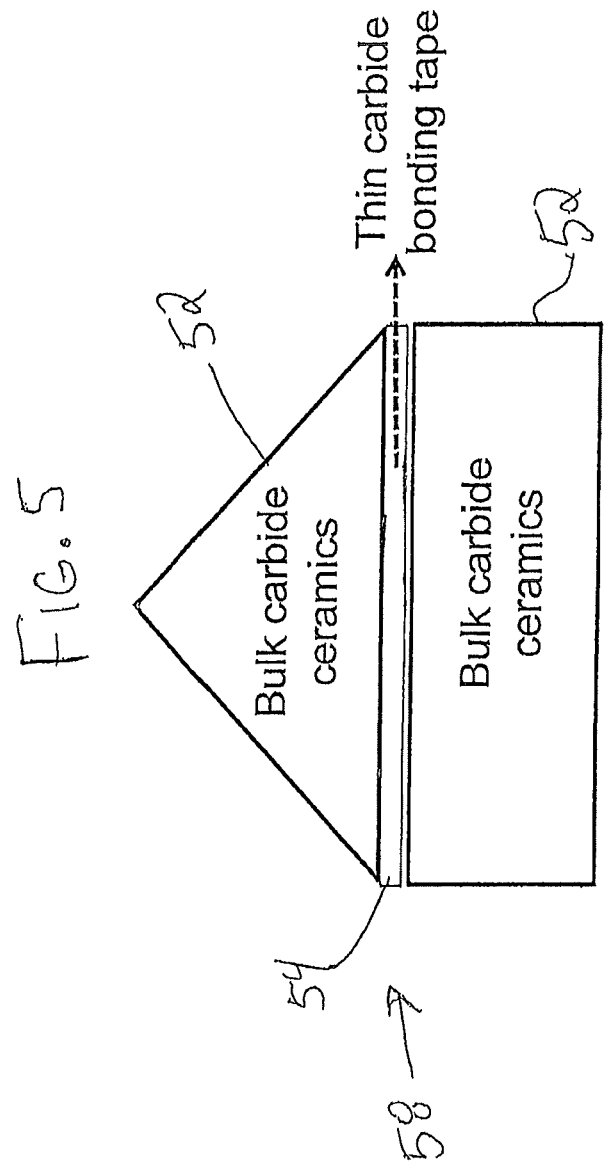

APPARATUS AND METHOD FOR JOINING OF CARBIDE CERAMICS

CROSS REFERENCE TO RELATED APPLICATIONS

The present application is a CONTINUATION of copending U.S. patent application Ser. No. 15/651,839 (the "'839 Applications") entitled "Apparatus and Method for Joining of Carbide Ceramics" and filed Jul. 17, 2017, now U.S. Pat. No. 10,906,203, the entirety of which is incorporated herein by reference for all purposes. The '839 Application claims priority to U.S. Provisional Application Ser. No. 62/362,973 filed Jul. 15, 2016, which is incorporated by reference herein for all purposes.

STATEMENT REGARDING FEDERALLY SPONSORED RESEARCH OR DEVELOPMENT

This invention was made with government support under grant #NRC-HQ-12-G-38-0011 awarded by the US Nuclear Regulatory Commission (NRC). The government has certain rights in the invention.

BACKGROUND OF THE DISCLOSURE

There is a need for better processing methods of carbide ceramics for additive manufacturing and carbide-carbide joining. Currently, joining or sintering of carbide ceramics such as silicon carbide (SiC) and tungsten carbide (WC) occurs through applying high temperature and/or high pressure and/or electric field and/or high energy light through processes such as hot isostatic pressing, polymer infiltration and pyrolysis (PIP) technique, reaction bonding and spark plasma sintering. However, high melting temperatures, band gap (Eg) mismatch and low resistance to thermoelastic stresses prevent ceramics from being fully densified by laser processing or thermally sintered at low temperature. In addition, traditional laser or thermal sintering of ceramic green bodies results in large volumetric shrinkage, shape distortion and often generates residual stress in final products.

This problem becomes more serious as a need for the additive manufacturing (AM) of ceramics and the ceramics-ceramics joining grows. The basic principle of AM is to directly print 3-dimensional (3D) structures and sinter them by in-situ laser irradiation or post-printing thermal treatment. While this approach works well for polymers and metals, the additive manufacturing of ceramics is relatively difficult due to the high melting temperature of ceramics and the relatively large powder particles used in powder bed 3D printing techniques. Therefore, the additive manufacturing of dense ceramic structures without shrinkage and shape deformation has not been widely achieved and the materials tend to contain large strength controlling pores. A similar issue exists in ceramics-ceramics joining. Once two ceramics parts are manufactured, it is very difficult to join two parts together, since the driving force for the material diffusion is very low in already sintered ceramics. Consequently, the joining section of two ceramics parts is often a weak link which easily breaks in harsh conditions (e.g., application of mechanical shear stress or thermal shock).

In summary, the present disclosure provides for the low temperature sintering of carbide ceramics through infiltration of metal nanoparticles which create transient liquid phases that accelerate the densification of ceramics. When the nanoparticle-containing precursor is impregnated into the void between large carbide grains, metal nanoparticles decorate the surface of large particles in the preform and react with carbide pre-ceramic polymer (or slurry) to form a eutectic liquid at low temperature. This transient liquid accelerates material diffusion and thereby promotes densification and the crystallization of the carbide ceramics much below normal sintering temperature of normal carbide powder formulations. Preferably, this infiltration technique of the present disclosure can be adapted to powder bed additive manufacturing processes and the processing of a bonding tape for joining of carbide ceramics.

BRIEF SUMMARY OF THE DISCLOSURE

Many other variations are possible with the present disclosure, and those and other teachings, variations, and advantages of the present disclosure will become apparent from the description and figures of the disclosure.

One aspect of a preferred embodiment of the present disclosure comprises a method for joining carbide ceramic particles, comprising: forming a first mixture comprising carbide ceramic particles, preceramic polymer liquid, fine carbon particles and metal nanoparticles that form a eutectic liquid at temperatures below 1400° C.; and heating the first mixture at a temperature of about 1150° C. to about 1400° C.

In another aspect of a preferred a method for joining carbide ceramic particles of the present disclosure, the carbide ceramic particles comprise one or more of SiC, WC or Mo2C; wherein the preceramic polymer liquid comprises polycarbosilane; and wherein the metal nanoparticles comprise one or more of Ni, Mo or Nb.

In yet another aspect of a preferred a method for joining carbide ceramic particles of the present disclosure, the carbide ceramic particles comprise one or more porous preforms and the preceramic polymer liquid, fine carbon particles and metal nanoparticles that form a eutectic liquid at temperatures below 1400° C. infiltrate pores or voids in the one or more porous preforms.

In a further aspect of a preferred a method for joining carbide ceramic particles of the present disclosure, a eutectic reaction occurs to form a transient liquid phase.

In another aspect of a preferred a method for joining carbide ceramic particles of the present disclosure, chemical elements of the carbide ceramic diffuse through the transient liquid phase and attach to surfaces of carbide ceramic particles, wherein the joined ceramic particles have increased density and crystallinity.

In yet another aspect, a preferred a method for joining carbide ceramic particles of the present disclosure further comprises adding additional amounts of the preceramic polymer liquid, fine carbon particles and metal nanoparticles that form a eutectic liquid at temperatures below 1400° C. to the first mixture after the heating to form a second mixture; and heating the second mixture at a temperature of about 1150° C. to about 1400° C.

In another aspect of a preferred a method for joining carbide ceramic particles of the present disclosure, the carbide ceramic particles comprise one or more of SiC, WC or Mo2C; wherein the preceramic polymer liquid comprises polycarbosilane; and wherein the metal nanoparticles comprise one or more of Ni, Mo or Nb.

In yet another aspect of a preferred a method for joining carbide ceramic particles of the present disclosure, the carbide ceramic particles comprise one or more porous preforms and the preceramic polymer liquid, fine carbon particles and metal nanoparticles that form a eutectic liquid at temperatures below 1400° C. infiltrate pores or voids in the one or more porous preforms.

In a further aspect of a preferred a method for joining carbide ceramic particles of the present disclosure, a eutectic reaction occurs to form a transient liquid phase.

In another aspect of a preferred a method for joining carbide ceramic particles of the present disclosure, chemical elements of the carbide ceramic diffuse through the transient liquid phase and attach to surfaces of carbide ceramic particles, wherein the joined ceramic particles have increased density and crystallinity.

In yet another aspect, a preferred a method for joining carbide ceramic particles of the present disclosure further comprises adding additional amounts of the preceramic polymer liquid, fine carbon particles and metal nanoparticles that form a eutectic liquid at temperatures below 1400° C. to the first mixture after the heating to form a second mixture; and heating the second mixture at a temperature of about 1150° C. to about 1400° C.

Another aspect of a preferred embodiment of the present disclosure comprises a method for joining SiC particles, comprising: forming a first mixture comprising SiC particles, preceramic polymer liquid, fine carbon particles and metal nanoparticles that form a eutectic liquid at temperatures below 1400° C.; and heating the first mixture at a temperature of about 1150° C. to about 1400° C.

In another aspect of a preferred a method for joining SiC particles of the present disclosure, the preceramic polymer liquid comprises polycarbosilane; and wherein the metal nanoparticles comprise one or more of Ni, Mo or Nb.

In yet another aspect of a preferred a method for joining SiC particles of the present disclosure, the SiC particles comprise one or more porous preforms and wherein the preceramic polymer liquid, fine carbon particles and metal nanoparticles that form a eutectic liquid at temperatures below 1400° C. infiltrate pores in the one or more porous preforms.

In a further aspect of a preferred a method for joining SiC particles of the present disclosure, a eutectic reaction occurs to form a transient liquid phase.

In another aspect of a preferred a method for joining SiC particles of the present disclosure, the Si and C diffuse through the transient liquid phase and attach to surfaces of SiC particles.

In yet another aspect, a preferred a method for joining SiC particles of the present disclosure further comprises adding additional amounts of the preceramic polymer liquid, fine carbon particles and metal nanoparticles that form a eutectic liquid at temperatures below 1400° C. to the first mixture after the heating to form a second mixture; and heating the second mixture at a temperature of about 1150° C. to about 1400° C.

An additional aspect of a preferred embodiment of the present disclosure comprises a method for joining WC particles, comprising: forming a first mixture comprising WC particles, preceramic polymer liquid, fine carbon particles and metal nanoparticles that form a eutectic liquid at temperatures below 1400° C.; and heating the first mixture at a temperature of about 1150° C. to about 1400° C.

In another aspect of a preferred a method for joining WC particles of the present disclosure, the WC particles comprise one or more porous preforms and wherein the preceramic polymer liquid, fine carbon particles and metal nanoparticles that form a eutectic liquid at temperatures below 1400° C. infiltrate pores in the one or more porous preforms.

In yet another aspect of a preferred a method for joining WC particles of the present disclosure, a eutectic reaction occurs to form a transient liquid phase.

In a further aspect of a preferred a method for joining WC particles of the present disclosure, W and C diffuse through the transient liquid phase and attach to surfaces of WC particles.

In yet another aspect, a preferred a method for joining WC particles of the present disclosure further comprises adding additional amounts of the preceramic polymer liquid, fine carbon particles and metal nanoparticles that form a eutectic liquid at temperatures below 1400° C. to the first mixture after the heating to form a second mixture; and heating the second mixture at a temperature of about 1150° C. to about 1400° C.

Another aspect of a preferred embodiment of the present disclosure comprises a bonding tape for joining carbide ceramic structures, wherein the bonding tape comprises: a mixture comprising carbide ceramic particles, preceramic polymer liquid, fine carbon particles and metal nanoparticles that form a eutectic liquid at temperatures below 1400° C.

In yet another aspect of a preferred bonding tape of the present disclosure, the carbide ceramic particles comprise one or more porous preforms and wherein the preceramic polymer liquid, fine carbon particles and metal nanoparticles that form a eutectic liquid at temperatures below 1400° C. infiltrate pores in the one or more porous preforms.

BRIEF DESCRIPTION OF THE SEVERAL VIEWS OF THE DRAWINGS

For the present disclosure to be easily understood and readily practiced, the present disclosure will now be described for purposes of illustration and not limitation in connection with the following figures, wherein:

FIG. 4 is a schematic representation of the method of the present disclosure employed to improve additive manufacturing processes using carbides; and FIG. 5 shows a schematic example of the process of the present disclosure in joining two carbide ceramic structures.

DETAILED DESCRIPTION

In the following detailed description, reference is made to the accompanying examples and figures that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "disclosure" merely for convenience and without intending to voluntarily limit the scope of this application to any single disclosure or inventive concept if more than one is in fact disclosed.

The following description is, therefore, not to be taken in a limited sense, and the scope of this disclosure is defined by the appended claims.

The present disclosure seeks to overcome these challenges through an innovative processing approach which can decrease the shrinkage of the ceramics and lower sintering temperatures in ceramic to ceramic joining, particularly for carbide ceramics. A major breakthrough according to the present disclosure is to use a mixture of pre-ceramic polymer (slurry) and metal nanoparticles. Since this mixture fills pores between larger carbide particles, shrinkage of the green body during the densification is suppressed. Moreover, a eutectic reaction between metal nanoparticles and the carbide particles forms the transient liquid phase that decreases the densification temperature. This innovation involves new carbide formulations for low temperature and/or pressureless sintering that allows for manufacturing of 1) high density carbide ceramics "as-designed" (i.e., without shrinkage and shape deformation) and 2) joining of two different ceramics parts.

New carbide formulations according to the present disclosure preferably comprise a mixture ("Precursor Mixture") of carbide particles (such as SiC, WC, Mo2C), preceramic polymer (such as polycarbosilane), fine carbon particles and metal nanoparticles (such as Ni, Mo, Nb) that form a eutectic liquid at low temperatures.

Figure 1:
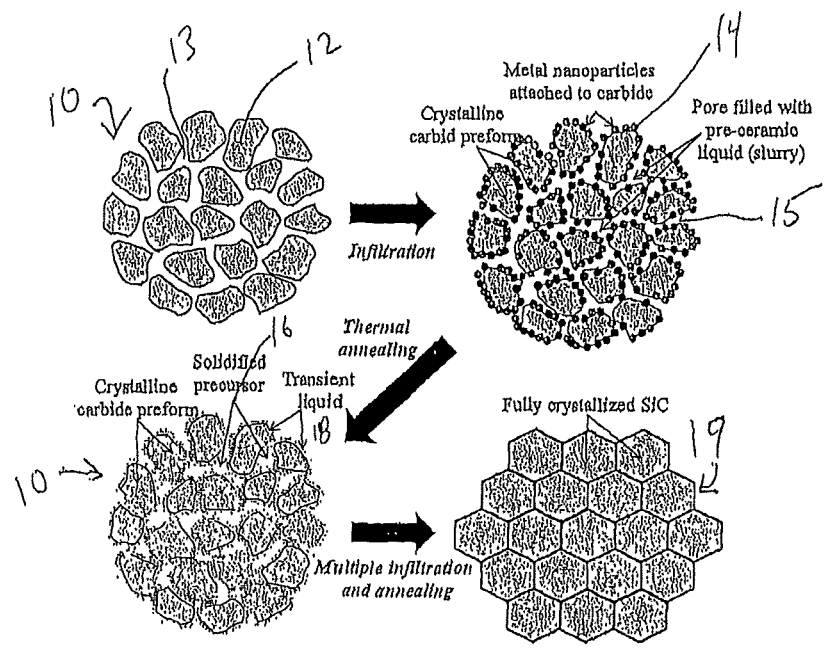
FIG. 1 schematically illustrates a preferred method of the present disclosure for ceramic to ceramic joining, particularly for carbide ceramics.

The basic science underlying the low temperature sintering of carbide ceramics according to the present disclosure is infiltration of metal nanoparticles which create transient liquid phases that accelerate the densification of ceramics. FIG. 1 schematically illustrates a preferred method of the present disclosure for ceramic to ceramic joining, particularly for carbide ceramics. When the nanoparticle-containing ceramic Precursor Mixture liquid 15 (described above) is impregnated into the voids 13 between large carbide grains 12 in a preform 10, metal nanoparticles 14 decorate the surface of large particles 12 in the preform 10 and react with carbide pre-ceramic polymer (or slurry) 15 to form a eutectic liquid 18 at low temperature. This transient liquid 18 accelerates material diffusion and thereby promotes densification and the crystallization of the carbide ceramics 19 much below normal sintering temperature of normal carbide powder formulations. A detailed reaction mechanism within this mixture is as follows. Metal nanoparticles react to form eutectic with Si, W, or Mo in the carbide formulations to form a eutectic silicide liquid below 1400° C. The eutectic liquid provides a transport path for the coarsening of primary carbide crystals and increasing the crystallinity. The eutectic liquid equilibrates with the carbon content in the precursor 16 to form stable nickel carbide, niobium carbide or molybdenum carbide phases to remove the liquid phase. Preferably, this infiltration method of the present disclosure can be adapted to powder bed additive manufacturing processes and the processing of a bonding tape for joining of carbide ceramics.

Figure 2:
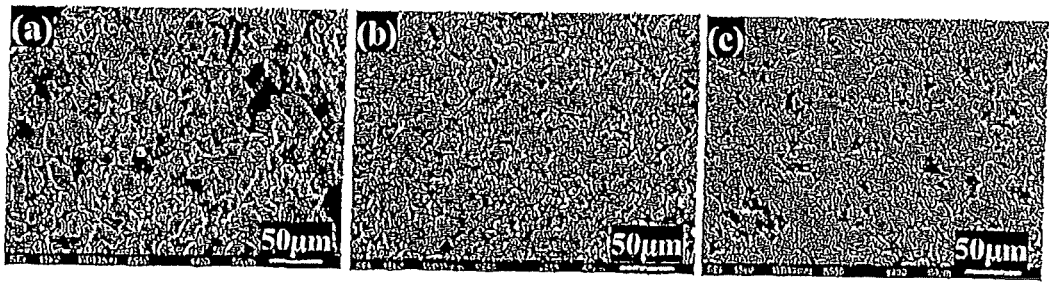
FIG. 2 comprises SEM micrographs of SiC ceramics preforms (a) before infiltration, (b) infiltrated with only polymer precursor and annealed at 1200° C., (c) infiltrated according to the present disclosure with metal nanoparticle infused precursor and sintered at 1200° C.

The results from a preferred method of the present disclosure for joining ceramic particles are shown in FIG. 2. FIG. 2 comprises SEM micrographs of SiC ceramics preforms (a) before infiltration, (b) infiltrated with only polymer precursor and annealed at 1200° C., (c) infiltrated according to the present disclosure with metal nanoparticle infused precursor and sintered at 1200° C.

The reaction between metal nanoparticles and SiC precursor promotes the crystallization of the amorphous SiC matrix and the relative density of polymer derived SiC ceramics can be increased up to 96%. FIG. 2 (*a*) shows the microstructure of a porous SiC preform consisting of crystalline SiC grains approximately 10 µm in size, before the liquid precursor was infiltrated. SiC particles were first dry pressed and partially sintered without any sintering agent. After the pores were filled with the precursor and thermally treated at 1200° C., very different microstructures were found and an effect of metal nanoparticles was clearly observed. Without the metal nanoparticles in the liquid ceramic precursor, rounded SiC grains evolved from the precursor matrix and the porous region became occupied by amorphous SiC as shown in FIG. 2(*b*). In contrast, FIG. 2(*c*) shows that SiC ceramics from the metal-nanoparticle infused precursor are composed of faceted SiC grains and the intergranular phase almost disappears. A mechanism for the metal nanoparticle assisted crystallization and densification of SiC ceramic is schematically shown in FIG. 1. Metal nanoparticles deposited on the surface of SiC preform reacts with SiC precursor 16 and forms the transient liquid 18. Then, Si and C diffuse through the liquid phase and attach on the surface of SiC grains 12, which thereby removes the intergranular amorphous phase at low temperature.

Figure 3:
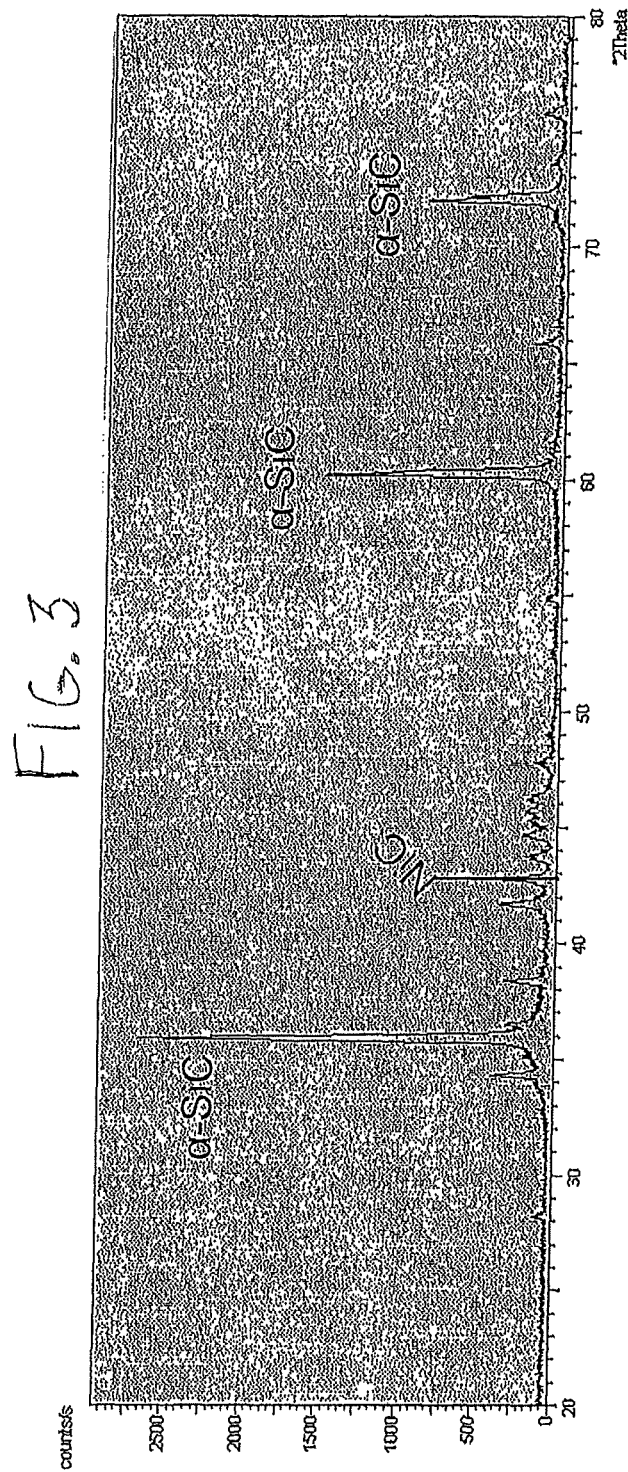
FIG. 3 is an x-ray diffraction pattern of SiC ceramics using Ni nanoparticles added carbide formation illustrating that highly crystalline SiC ceramics (with residual metal carbide, in the case of FIG. 3, NiC) can be produced according to the method of the present disclosure.

FIG. 3 is an x-ray diffraction pattern of SiC ceramics using Ni nanoparticles added carbide formation illustrating that highly crystalline SiC ceramics (with residual metal carbide, in the case of FIG. 3, NiC) can be produced according to the method of the present disclosure.

As shown in FIG. 4, the method of the present disclosure preferably may be employed to improve additive manufacturing processes using carbides. As shown in FIG. 4, an SiC Precursor Mixture 40 containing metal nanoparticles (not shown) and fine carbon particles 42 is applied to a dry bed or structure 41 comprised of large SiC particles 43. Another layer of large SiC particles 43 is applied over SiC Precursor Mixture 40 and the whole structure is heated to around 1200° C. to 1400° C. which causes rapid formation of liquid silicides, liquid sintering and then the formation of more stable and refractory carbides and crystalline SiC 45. One advantage of such process is that complex shapes may be processed via low temperature sintering of SiC (or other carbide ceramics) without shape change or shrinkage.

FIG. 5 shows an example of the process of the present disclosure in joining two carbide ceramic structures. Here, the method of the present disclosure preferably may be employed to fabricate a new flexible silicon carbide bonding tape 54 which can be placed between silicon carbide surfaces 52 to be joined together via heating at temperatures below 1400° C. and achieve densification and bonding without shrinkage. First, a slip will be made from a preferred carbide formulation such as the Precursor Mixture described above. The slip is formed into a thin tape 54 by tape casting and drying. Then the tape 54 with a preferred thickness of 0.1 mm-5 mm will be infiltrated with additional carbon-rich SiC Precursor Mixture and placed between two bulk carbide ceramic structures 52. Heating of this whole structure 58 leads to the joining of the two parts 52 according to the above described mechanism of the present disclosure to achieve good densification and bonding without shrinkage.

It will be readily understood to those skilled in the art that various other changes in the details, components, material, and arrangements of the parts and methods which have been described and illustrated in order to explain the nature of this disclosure may be made without departing from the principles and scope of the disclosure as expressed in the subjoined claims.

In the foregoing description of preferred embodiments of the present disclosure, various features are grouped together in a single embodiment to streamline the disclosure. This method of disclosure is not to be interpreted as reflecting an intention that the claimed embodiments of the disclosure require more features than are expressly recited in each claim. Rather, as the following claims reflect, inventive subject matter lies in less than all features of a single disclosed embodiment. Thus, the following claims are hereby incorporated into the foregoing description, with each claim standing on its own as a separate embodiment.

What is claimed is:

1. A bonding tape for joining carbide ceramic structures, wherein the bonding tape comprises:
    a mixture comprising carbide ceramic particles, preceramic polymer liquid, carbon particles and metal nanoparticles that form a eutectic liquid at temperatures below 1400° C.

2. The bonding tape of claim 1 wherein the carbide ceramic particles comprise one or more porous preforms and wherein the preceramic polymer liquid, carbon particles and metal nanoparticles that form a eutectic liquid at temperatures below 1400° C. infiltrate pores in the one or more porous preforms.

3. The bonding tape of claim 1 wherein the metal nanoparticles comprise one or more metals selected from the group of nickel, niobium and molybdenum.

4. The bonding tape of claim 2 wherein the metal nanoparticles comprise one or more metals selected from the group of nickel, niobium and molybdenum.

5. The bonding tape of claim 1 wherein the carbide ceramic particles comprise one or more of silicon carbide, tungsten carbide or molybdenum carbide.

6. The bonding tape of claim 2 wherein the carbide ceramic particles comprise one or more of silicon carbide, tungsten carbide or molybdenum carbide.

7. The bonding tape of claim 1 wherein the preceramic polymer liquid comprises polycarbosilane.

8. The bonding tape of claim 1, wherein the preceramic polymer liquid comprises polycarbosilane;
    wherein the carbide ceramic particles comprise one or more of silicon carbide, tungsten carbide and molybdenum carbide; and
    wherein the metal nanoparticles comprise one or more metals selected from the group of nickel, niobium and molybdenum.

* * * * *